(12) United States Patent
Schwabe et al.

(10) Patent No.: US 11,851,587 B2
(45) Date of Patent: Dec. 26, 2023

(54) PERMANENTLY TACKY ADHESIVES WITH IMPROVED ENVIRONMENTAL COMPATIBILITY

(71) Applicant: Clariant International Ltd, Muttenz (CH)

(72) Inventors: Jeremia Schwabe, Augsburg (DE); Erik Hauck, Pirmasens (DE); Gerd Hohner, Augsburg (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 716 days.

(21) Appl. No.: 17/047,722

(22) PCT Filed: Apr. 8, 2019

(86) PCT No.: PCT/EP2019/058834
§ 371 (c)(1),
(2) Date: Oct. 15, 2020

(87) PCT Pub. No.: WO2019/201649
PCT Pub. Date: Oct. 24, 2019

(65) Prior Publication Data
US 2021/0147726 A1    May 20, 2021

(30) Foreign Application Priority Data
Apr. 18, 2018  (DE) ..................... 10 2018 109 269.5

(51) Int. Cl.
| | | |
|---|---|---|
| *C09J 123/14* | (2006.01) | |
| *C09J 123/16* | (2006.01) | |
| *C09J 123/08* | (2006.01) | |
| *C09J 7/38* | (2018.01) | |
| *C08F 210/06* | (2006.01) | |

(52) U.S. Cl.
CPC .......... *C09J 123/14* (2013.01); *C08F 210/06* (2013.01); *C08F 2500/08* (2013.01); *C08F 2500/12* (2013.01); *C08F 2500/17* (2013.01); *C08F 2500/32* (2021.01); *C09J 2301/302* (2020.08); *C09J 2301/414* (2020.08); *C09J 2423/10* (2013.01)

(58) Field of Classification Search
CPC ..... C09J 7/38; C09J 7/381; C09J 7/387; C09J 123/08; C09J 123/14; C09J 123/142
See application file for complete search history.

(56) References Cited

U.S. PATENT DOCUMENTS

| | | | |
|---|---|---|---|
| 5,081,322 A | 1/1992 | Winter et al. | |
| 5,723,705 A | 3/1998 | Herrmann et al. | |
| 5,998,547 A | 12/1999 | Hohner | |
| 6,211,303 B1 | 4/2001 | Hohner | |
| 6,987,142 B2 | 1/2006 | St. Clair et al. | |
| 8,846,991 B2 | 9/2014 | Karjala et al. | |
| 2004/0127614 A1 | 7/2004 | Jiang et al. | |
| 2007/0117894 A1 | 5/2007 | Bach et al. | |
| 2007/0117906 A1 | 5/2007 | Bach et al. | |
| 2016/0053149 A1* | 2/2016 | Herrlich | ............... C09J 123/142 106/270 |
| 2017/0088754 A1 | 3/2017 | Sustic et al. | |
| 2019/0276713 A1* | 9/2019 | Steib | .................. C09J 123/0815 |

FOREIGN PATENT DOCUMENTS

| | | |
|---|---|---|
| CN | 105247001 | 1/2016 |
| DE | 102013005089 | 9/2014 |
| DE | 102016220263 | 4/2018 |
| EP | 0058677 B1 | 2/1986 |
| EP | 0890583 A1 | 1/1990 |
| EP | 0384264 A1 | 8/1990 |
| EP | 0571882 A2 | 12/1993 |
| EP | 0632063 A1 | 1/1995 |
| EP | 0200351 B2 | 10/1996 |
| EP | 1788056 A1 | 5/2007 |
| EP | 2112180 A1 | 10/2009 |
| EP | 1353997 B1 | 6/2010 |
| JP | H03-197516 A | 8/1991 |
| JP | 2002-302659 A | 10/2002 |
| JP | 2006-502259 A | 1/2006 |
| JP | 2006063123 A | 3/2006 |
| JP | 2007091903 A | 4/2007 |
| JP | 2007-138171 A | 6/2007 |
| JP | 2007-138172 A | 6/2007 |
| JP | 2007255687 A | 10/2007 |

(Continued)

OTHER PUBLICATIONS

Heddleson et al., "The Dahlquist Criterion: Applicability of a Rheological Criterion to the Loss of Pressure-Sensitive Tack in Flour-Water Dough", Cereal Chemistry, 70(6), pp. 744-748; 1993.
International Search Report (with partial translation) and Written Opinion dated Jun. 26, 2019, issues in corresponding International Patent Application No. PCT/EP2019/058834.

*Primary Examiner* — Michael J Feely
(74) *Attorney, Agent, or Firm* — Natali Richter

(57) ABSTRACT

The invention provides resin- and mineral oil-free pressure-sensitive adhesive compositions, comprising 55%-100% by weight of a copolymer of propylene and one or more further monomers selected from the group composed of ethylene and 1-olefins having 4 to 20 carbon atoms, wherein the copolymer has been prepared with the aid of metallocene catalysts and is characterized by a. a melt viscosity at 170° C. of 20 to 8000 mPas (DIN 53019);
b. a density of 0.84 to 0.90 g/cm$^3$ (23° C., ISO 1183);
c. a glass transition temperature of less than −30° C. (DIN EN ISO 11357-2:2014); and
d. a flow point, measured according to ASTM D97, of less than 50° C., which due to their permanently tacky properties are suitable as pressure-activated pressure-sensitive adhesives.

19 Claims, No Drawings

(56) References Cited

FOREIGN PATENT DOCUMENTS

| | | |
|---|---|---|
| JP | 2014-173027 A | 9/2014 |
| WO | 2014/205336 A2 | 12/2014 |
| WO | 2015/005266 A1 | 1/2015 |

\* cited by examiner

PERMANENTLY TACKY ADHESIVES WITH IMPROVED ENVIRONMENTAL COMPATIBILITY

The invention relates to resin- and mineral oil-free pressure-sensitive adhesives for the adhesive bonding of substrates, the pressure-sensitive adhesives containing a copolymer of propylene which has been prepared using metallocene catalysts.

Pressure-sensitive adhesives (PSAs) are suitable for producing adhesive connections between the surfaces of adherends made from various materials (substrates). Here, the substrates, including those with low surface energy, are wetted and joined together via gentle pressure on the adherends. The adhesive effect, which is based on physical principles, is usually reversible and can subsequently be released without destroying the substrates.

Pressure-sensitive adhesive compositions have a multiplicity of possible uses. They are used in particular for adhesive connections that are reversible and leave no adhesive residues on the substrate, such as for example protective films, masking tapes for painters, sticky notes, labels, adhesive plasters and handicraft items. Under certain circumstances, however, permanent adhesive bonds are also realizable, such as for example for security tags, security envelopes, security bags, film adhesive tapes, filters, packagings, hygiene articles and adhesive bonds in the automotive sector or in construction.

The processing of pressure-sensitive adhesives, in particular the application to the corresponding substrates, can be realized by various methods, for instance from the melt, from an aqueous dispersion or from a solution using organic solvents.

Pressure-sensitive adhesive compositions which are applied from the melt are among the hot-melt adhesives, which by melting the adhesive composition are converted into a state in which they can be readily applied to the substrates to be adhesively bonded and can adhesively bond same. In contrast to conventional hot-melt adhesives, pressure-sensitive adhesives however feature an infinitely long open time, that is to say the period of time in which the adhesive can be used for adhesive bonding. This results in permanent tack at room temperature. In contrast thereto, a conventional hot-melt adhesive has a relatively short open time and after cooling enters into an irreversible connection with the substrate.

The permanent tack of pressure-sensitive adhesive compositions can be qualitatively described by means of a physical parameter, specifically the "Dahlquist criterion". This is a rheological criterion for tack and can be derived from oscillatory rheometer experiments. The storage modulus of the adhesive can be determined by a frequency sweep at a given temperature (here 25° C.). If the storage modulus at 25° C. and 1 Hz is greater than $10^5$ Pa, there is no tack (S. S Heddleson et. al; Cereal Chem. 70(6) 744; 1993). If adhesives have a storage modulus of $<10^5$ Pa, there is permanent tack, as is characteristic for pressure-sensitive adhesives.

In order to be able to achieve permanent tack of a pressure-sensitive adhesive composition, pressure-sensitive adhesive compositions consist of a formulation composed of a cohesive base polymer, an adhesive tackifier, optionally in conjunction with a plasticizer, and further additions.

Cohesive base polymers used are polymers such as for example natural and synthetic rubbers, polyacrylates, polyisobutylenes, polyolefins, polyesters, polychloroprenes, polyvinyl ethers, polyurethanes, styrene-butadiene or styrene-isobutene block copolymers. These base polymers are generally responsible for the cohesive effect of the adhesive system.

The adhesive effect of the tackifier in pressure-sensitive adhesive compositions is primarily determined by resin components. These resins are low molecular weight products from the C5 or C9 stream from petroleum processing, often contain aromatics and usually have a glass transition temperature which lies above room temperature.

Thus, the admixture of resins into hot-melt adhesive formulations increases the glass transition temperatures of the formulations, meaning that corresponding adhesives suffer from reduced low-temperature flexibility and the window for use is restricted in terms of temperature.

Resins typically have densities of in some cases greater than 1 $g/cm^3$. The use of such resins in hot-melt adhesive formulations therefore results in an increase in the density, especially in polyolefin formulations. This means that for a constant application volume more adhesive by weight is required, which both constitutes a negative cost factor and results in a higher weight of the adhesively bonded substrates.

Resins used include polyterpene resins, natural and modified colophony resins, especially resin esters, glycerol esters of wood resins, phenol-modified pentaerythritol esters and phenol-modified terpene resins. Such resin types contain substances which are an irritant/a health concern such as abietic acid and may trigger allergies, as a result of which they are questionable for applications in the hygiene sector, for foodstuff packagings and in the medical sector.

The plasticizer in the adhesive formulation serves to reduce the viscosity of the adhesive composition and thus to improve its processability and applicability. Permanently tacky pressure-sensitive adhesive compositions generally contain mineral oils as plasticizers, in some cases in significant amounts.

Mineral oils are petroleum-based and accordingly contain paraffinic, naphthenic, aromatic and polycyclic compounds as well as volatile organic compounds (VOCs) which contribute to increased indoor air pollution. The compounds also present in mineral oils as MOSH and MOAH (mineral oil saturated hydrocarbons and mineral oil aromatic hydrocarbons respectively) are classed as toxicologically hazardous due to their tendency to accumulate in human tissue. Mineral oils are usually poorly integrated in adhesive formulations and thus have a tendency toward increased migration. For these reasons, mineral oil-free formulations are desirable for foodstuff packagings and adhesively bonded hygiene products.

U.S. Pat. No. 6,987,142 describes pressure-activated pressure-sensitive adhesive compositions based on styrene block copolymers and containing resins as tackifiers and mineral oils as plasticizers.

EP1353997B1 describes hot-melt adhesive compositions formed from amorphous ethylene/propylene copolymers, non-stereoregular polypropylene homopolymers and optionally tackifiers. The ethylene-propylene copolymers mentioned are preferably not prepared using metallocene catalysts and have preferred glass transition temperatures of between −33 and −23° C. The polypropylene homopolymers are preferably prepared using metallocene catalysts, have melt viscosities at 190° C. of >50 000 mPas and glass transition temperatures of between −15 and +10° C.

EP1788056 describes the use of polyolefin waxes in hot-melt adhesive compositions, wherein the hot-melt adhesive composition comprises at least 60% of one or more atactic, amorphous polyalphaolefins and up to 40% of isotactic homopolymer and/or copolymer waxes formed from the monomers ethylene or propylene and/or higher linear or branched alpha-olefins having 4 to 20 carbon atoms.

It is known that polyolefins which have been prepared using metallocene catalysts differ in terms of their structure from polyolefins which have been prepared by other insertion mechanisms, for example using Ziegler-Natta catalysts. These differences may relate, for example, to the incorporation of comonomers or the molar mass distribution. Generally speaking, however, it is not possible to translate such specific differences into differences in performance properties.

US2004/0127614A1 describes pressure-sensitive adhesive formulations containing polypropylenes prepared using metallocene catalysts, and also containing resins and mineral oils.

EP200351B2 and EP58677B1 disclose low molecular weight, amorphous copolymers formed from 1-olefins and ethylene, which have been prepared with the aid of metallocene catalysts. Statistical copolymers formed from ethylene and higher 1-olefins having 3-20 carbon atoms are described which were prepared using bridged or unbridged metallocenes of the biscyclopentadienyl type. The copolymers are suitable for use in lubricating oils.

US2017088754A1 describes amorphous polyalphaolefins (APAOs) formed from ethylene and higher 1-olefins, especially propylene, butylene, 1-hexene, which were prepared using heterogeneous Ziegler-Natta catalysts and are used for hot-melt adhesive formulations. Tackifiers are used here to improve the properties.

EP0384264A1 discloses waxy copolymers which are formed from propylene and ethylene, have been prepared using metallocene catalysts and exhibit semicrystalline character.

Beyond the prior art, there remains a need for improved adhesive formulations for PSAs which contain neither resins nor mineral oils and thus exhibit improved environmental compatibility, a lower cost level and possibly a lower weight.

It has surprisingly been found that certain copolymers of propylene which have been prepared using metallocene catalysts are particularly suitable for use in pressure-sensitive adhesives, without the need for resins and mineral oil additions.

Resins within the context of the invention are low molecular weight products from the C5 or C9 stream from petroleum processing, contain aromatics and have a glass transition temperature which lies above room temperature. In the context of the invention, resin- and mineral oil-free is to be understood as meaning that the resin/mineral oil fraction is in each case below 1% by weight based on the pressure-sensitive adhesive composition according to the invention.

The present invention provides resin- and mineral oil-free pressure-sensitive adhesive compositions, comprising 55%-99% by weight, particularly preferably 60%-95% by weight, of at least one copolymer of propylene and one or more further monomers selected from the group composed of ethylene and 1-olefins having 4 to 20 carbon atoms. The pressure-sensitive adhesive composition according to the invention may optionally comprise a further polymer. The copolymer of propylene is prepared with the aid of metallocene catalysts and is characterized by a. a melt viscosity at 170° C. of 20 to 8000 mPas (DIN 53019), preferably of 30 to 5000 mPas, particularly preferably of 50 to 3000 mPas, b. a density of 0.84 to 0.90 g/cm$^3$ (23° C., ISO 1183), preferably of 0.85 to 0.89 g/cm$^3$, c. a glass transition temperature of less than −30° C. (DIN EN ISO 11357-2:2014), particularly preferably of less than −35° C., very particularly preferably of less than −40° C., and d. a flow point, measured according to ASTM D97, of less than 50° C., preferably of less than 40° C.

In a preferred embodiment, the copolymer of propylene according to the invention has an enthalpy of fusion, measured according to ISO 11357-2, of 0 to 50 J/g, preferably of 0 to 30 J/g, particularly preferably of 0 to 20 J/g.

In a preferred embodiment, the copolymer of propylene used for the pressure-sensitive adhesive composition according to the invention consists of 70% to 95% by weight of propylene and of 5%-30% by weight of ethylene.

The pressure-sensitive adhesive composition according to the invention preferably also comprises, in addition to the copolymer of propylene, 0% to 45% by weight, particularly preferably 1% to 45% by weight, and very particularly preferably 5% to 30% by weight of one or more further polymers, selected from the group of the following polymer types:

Further polyolefins:

The further polyolefins can be obtained by polymerization of any non-polar or polar, branched or unbranched olefins or combinations of these. The polyolefins can be prepared by ionic, free-radical or insertion mechanisms. Preference is given to non-polar monomers using Ziegler-Natta or metallocene catalysts for the preparation of the polyolefins. Low molecular weight semicrystalline homopolymers or copolymers, as are available on the market for example from the manufacturer Clariant under the name Licocene®, are particularly suitable. Preference is also given to copolymers of ethylene with propylene or else higher α-olefins such as 1-butene or 1-octene, known for instance under trade names such as for example Versify®, Infuse®, Affinity®, Licocene® or Engage® (Dow Chemical Comp.) or Vistamxx® or Exact® (Exxon Mobil Chemical) or Vestoplast (Evonik) or Eastoflex (Eastman). Preference is also given to block copolymers formed from styrene and dienes such as isoprene or butadiene, possibly containing proportions of ethylene (SIS, SBS, SEBS, SEP). So-called amorphous polyalphaolefins (APAOs), atactic polypropylene (APP) or polyisobutene (PIB) are further preferred.

Natural or synthetic rubbers, polyacrylates, polyesters, polychloroprenes, polyvinyl ethers and/or polyurethanes;

non-polar waxes such as for example polyethylene or polypropylene waxes, paraffin waxes such as for example Fischer-Tropsch paraffins, micro- or macrocrystalline paraffins, polar waxes such as for example oxidized or polar-olefin-grafted polyolefin waxes, ethylene-vinyl acetate copolymer waxes and/or ethylene-acrylic acid copolymer waxes.

The pressure-sensitive adhesive compositions according to the invention may also contain organic or inorganic pigments, fillers, flame retardants, stabilizers, antistats, antioxidants and light stabilizers.

In a preferred embodiment, the further polymers are further polyolefins characterized by a. a glass transition temperature of less than −15° C. (DIN EN ISO 11357-2:2014), b. a melt viscosity at 170° C. of less than 50 000 mPas (DIN 53019), and c. a flow point of greater than 50° C. (ASTM D97).

They are particularly preferably copolymers of ethylene or propylene such as for example Licocene® (Clariant), Versify®, Infuse®, Affinity® or Engage® (Dow Chemical Comp.) or Vistamaxx® or Exact® (Exxon Mobil Chemical) or Vestoplast (Evonik) or Eastoflex (Eastman).

In a further preferred embodiment, the pressure-sensitive adhesive compositions according to the invention have a Dahlquist criterion of G'≤105 Pa at 25° C. and 1 Hz.

The Dahlquist criterion is a rheological criterion for tack and can be derived from oscillatory rheometer experiments. The storage modulus of the adhesive can be determined by a frequency sweep at a given temperature (here 25° C.). If the storage modulus at 25° C. and 1 Hz is greater than $10^5$ Pa, there is no tack (S. S Heddleson et. al; Cereal Chem. 70(6) 744; 1993). If adhesives have a storage modulus of less than $10^5$ Pa, there is permanent tack, as is characteristic for pressure-sensitive adhesives.

In a further preferred embodiment, the copolymers of propylene according to the invention have undergone polar modification. It is known that polar modifications of polyolefins can be produced from non-polar polyolefins by oxidation with oxygen-containing gases such as air, or by polymer-analogous reactions with polar monomers such as α,β-unsaturated carboxylic acids or derivatives thereof such as aryl acid, maleic acid or maleic anhydride and also unsaturated organosilane compounds such as alkoxyvinyl-silanes. Polar modifications of polyolefins by air oxidation are described in EP0890583A1, the functionalization by means of grafting is described for example in U.S. Pat. No. 5,998,547A.

The production of the copolymers of propylene used for the pressure-sensitive adhesive compositions according to the invention employs metallocene catalysts consisting of chiral or achiral transition metal compounds of the formula $M^1L_x$. The transition metal compound $M^1L_x$ contains at least one metal central atom $M^1$, to which at least one π-ligand L, for example a cyclopentadienyl ligand, is bonded. Substituents, such as for example halogen, alkyl, alkoxy or aryl groups, may also be bonded to the metal central atom $M^1$. $M^1$ is preferably an element of main group III, IV, V or VI of the periodic table of the elements, such as Ti, Zr or Hf. Cyclopentadienyl ligands are to be understood as meaning unsubstituted cyclopentadienyl radicals and substituted cyclopentadienyl radicals such as methylcyclopentadienyl, indenyl, 2-methylindenyl, 2-methyl-4-phenylindenyl, tetrahydroindenyl or octahydrofluorenyl radicals. The π-ligands may be bridged or unbridged, and single and multiple bridges—including via ring systems—are possible. To activate the single-center catalyst systems, suitable cocatalysts are employed, for example organoaluminum compounds, in particular aluminoxanes or else aluminum-free systems. Examples of metallocene catalysts, their activation and handling for polymerization are described for example in EP 0384264 and EP 0571882. The term metallocene also encompasses compounds having more than one metallocene fragment, so-called polynuclear metallocenes. These may include any desired substitution patterns and bridging variants. The individual metallocene fragments of such polynuclear metallocenes may be either identical or different from one another. Examples of such polynuclear metallocenes are described in EP 0632063 for example.

Depending on the process, supported single-center catalysts may also be employed. Catalyst systems where the residual contents of support material and cocatalyst do not exceed a concentration of 100 ppm in the product are preferred.

The copolymers of propylene used for the pressure-sensitive adhesive compositions according to the invention can both assume the function of the base polymer and replace the functions of plasticizers and tackifiers in the formulation. This results in a number advantages for the user. For example, fewer components need to be melted and mixed, resulting in faster and more cost-effective working processes. It is also possible to produce purely polyolefin-based PSAs.

The use of copolymers of propylene according to the invention as tackifiers instead of resins and plasticizers ensures improved integration thereof into the polyolefin matrix, which results in reduced migration (no "bleed-through") and reduced formation of VOCs. The copolymers of propylene according to the invention additionally reduce the glass transition temperatures of the adhesive formulations. This makes areas of application even at low temperatures possible and improves the low-temperature flexibility of corresponding materials.

The copolymers of propylene used for the pressure-sensitive adhesive compositions according to the invention have typical densities of approx. 0.85 g/cm$^3$. Compared to resins having typical densities of approx. 1.0 g/cm$^3$, the use of these copolymers of propylene makes it possible to apply the same volumes of adhesive with less weight. This not only reduces the costs for the user but also ensures resource savings and more lightweight materials in the end application.

The pressure-sensitive adhesive compositions according to the invention are suitable for joining, that is to say wetting and adhesively bonding substrates, especially those having low-energy surfaces with a surface energy at room temperature of less than 35 mN/m, preferably of less than 25 mN/m, as possessed for example by substrates made from Teflon or substrates having siliconized surfaces.

The examples which follow are intended to describe the invention in more detail without, however, restricting it:

EXAMPLE 1

Preparation of a Propylene-Ethylene Copolymer According to the Invention (in Accordance with EP 0384264A1, Examples 1-16).

A dry 16 dm$^3$ tank was flushed with nitrogen and filled with 50 dm$^3$ (corresponding to 3.1 bar) of hydrogen and with 10 dm$^3$ of liquid propylene. Then, 30 cm$^3$ of toluenic methylaluminoxane solution (corresponding to 40 mmol of Al, average degree of oligomerization of the methylaluminoxane n=20) and 100 g of ethylene were added and the mixture was stirred for 15 minutes at 30° C.

At the same time, 8.0 mg of the metallocene dimethylsilylbis-1-indenylzirconium dichloride were dissolved in 15 cm$^3$ of toluenic methylaluminoxane solution (20 mmol of Al) and pre-activated by leaving to stand for 15 minutes. The orange-red solution was added to the tank. The polymerization system was heated to 80° C. and maintained at this temperature during the polymerization time (60 min) by appropriate cooling. A further 330 g of ethylene were metered in steadily during the polymerization time.

The propylene-ethylene copolymer obtained (yield 1.95 kg) had a propylene content of 79.5% by weight. Determination was effected by $^{13}$C NMR spectroscopy in accordance with Ser van der Ven, Polypropylene and other Polyolefins, chap. 13, p. 568f, Amsterdam, Oxford, New York, Tokyo 1990. The copolymer exhibited the following indices:

Melt viscosity at 170° C.: 210 mPas (DIN 53019)
Density at 23° C.: 0.85 g/cm$^3$ (ISO 1183)
Glass transition temperature: −48° C. (DIN EN ISO 11357-2:2014)
Enthalpy of fusion: 0 J/g (ISO 11357-3)
Flow point: 24° C. (ASTM D97)

EXAMPLE 2

A dry 50 dm$^3$ tank was flushed with nitrogen and filled with 9 dm$^3$ of isohexane, 11.9 dm$^3$ of hydrogen (corresponding to 530 mmol) and also 1.4 dm$^3$ of propylene and 140 cm$^3$ of ethylene.

At the same time, 5.2 mg of the metallocene dimethylsilylbis-1-indenylzirconium dichloride were dissolved in 5 cm$^3$ of toluenic methylaluminoxane solution (20 mmol of Al) and pre-activated by leaving to stand for 15 minutes. The orange-red solution was added to the tank. The polymerization system was heated to 105° C. and maintained at this temperature during the polymerization time (60 min) by appropriate cooling. A further 200 g of ethylene were metered in steadily during the polymerization time.

The propylene-ethylene copolymer obtained (yield 2.9 kg) had a propylene content of 87.1% by weight. Determination was effected by $^{13}$C NMR spectroscopy in accordance with Ser van der Ven, Polypropylene and other Polyolefins, chap. 13, p. 568f, Amsterdam, Oxford, New York, Tokyo 1990. The copolymer exhibited the following indices:

Melt viscosity at 170° C.: 4500 mPa·s (DIN 53019)
Density at 23° C.: 0.86 g/cm$^3$ (ISO 1183)
Glass transition temperature: −38° C. (DIN EN ISO 11357-2:2014)
Enthalpy of fusion: 10 J/g (ISO 11357-3)
Flow point: 45° C. (ASTM D97)

Melt mixtures of the components were prepared by homogeneous stirring at 170° C. according to tables 1 and 2 and the melt viscosity and density of the resulting pressure-sensitive adhesive composition were determined. Resins available under the trade names Regalite®, Sukorez® (Kolon), Kristalex®, Eastotac®, Piccotac® (Eastman Chemical Company) or Escorez® (Exxon Mobil) were used in the comparative formulations.

The adhesive effect of the hot-melt adhesive composition according to the invention was determined qualitatively in various experiments.

This involved applying the pressure-sensitive adhesive composition according to the invention to a substrate by melting and homogenizing the materials at 200° C. and subsequently applying (knife coating) at 180° C. After 24 h this substrate thus-coated was adhesively bonded to a second substrate made of the same or of a different material by pressing together the faces to be joined. After a waiting time of 5 min, the pressure-sensitive adhesive properties were assessed by separating the two substrates from each other again. A distinction was made in this case as to whether the adhesive bond a) was adhesively separable (A) (i.e. the adhesive connection is separated at the substrate face) or
b) was cohesively separable (C) (i.e. the adhesive connection is separated within the adhesive phase and adhesive residues remain on both substrate faces), or
c) whether there was material failure (M) signifying destruction of the substrate before the adhesive connection is separated, that is to say the adhesive connection is cohesively and adhesively stronger than the substrates.
d) If no pressure-activated adhesive bonding was possible because the pressure-sensitive adhesive composition could not be activated by gentle application of pressure with the thumb, then the designation (D) was assigned.

In addition, the tack of the pressure-sensitive adhesive composition was evaluated by tactile comparison and was divided into the following categories: a) marked, aggressive; b) barely distinct; c) not present.

The open time was determined by melting and homogenizing the materials at 200° C. The mixture is applied (knife coated) to cardboard at 180° C. and a cardboard strip is stuck on every 5 s by application of pressure with the thumb. This process is repeated until the cardboard no longer sticks or only sticks slightly. The time measured from application until the cardboard no longer sticks is the open time.

TABLE 1

| Application examples (according to the invention)/(use amounts in % by weight) | | | | | | | | | | | |
|---|---|---|---|---|---|---|---|---|---|---|---|
| | AE 1 | AE 2 | AE 3 | AE 4 | AE 5 | AE 6 | AE 7 | AE 8 | AE 9 | AE 10 | AE 11 |
| Polyolefin (inv. 1) | 75 | 70 | 50 | 65 | 65 | 80 | 90 | 100 | | | |
| Polyolefin (inv. 2) | | | | | | | | | 100 | 70 | 50 |
| Versify 4301 | 15 | 20 | | 20 | 20 | 20 | 10 | | | 30 | |
| Vestoplast 703 | 10 | | | | | | | | | | |
| Vestoplast 828 | | 10 | | | | | | | | | |
| Eastoflex 1060 | | | 50 | 15 | | | | | | | 50 |
| Vestoplast 608 | | | | | 15 | | | | | | |
| Viscosity @170° C. [mPa·s] | 1814 | 7332 | 1673 | 5025 | 4721 | 3606 | 862 | 200 | 8120 | 7200 | 8100 |
| Density [g/cm$^3$] | 0.854 | 0.853 | 0.857 | 0.853 | 0.854 | 0.854 | 0.854 | 0.851 | 0.85 | 0.858 | 0.854 |
| Dahlquist crit. satisfied | yes | yes | yes | yes | yes | yes | yes | yes | yes | yes | yes |
| Open time | Endless | Endless | Endless | Endless | Endless | Endless | Endless | Endless | Endless | Endless | Endless |
| Adhesive prop. Glass/PET | A | A | C | A | A | C | C | C | C | A | C |
| Adhesive prop. PP/PP | C | C | C | C | C | C | C | C | C | C | C |
| Adhesive prop. PE/PE | C | C | C | C | C | C | C | C | C | C | C |

TABLE 1-continued

Application examples (according to the invention)/(use amounts in % by weight)

| | AE 1 | AE 2 | AE 3 | AE 4 | AE 5 | AE 6 | AE 7 | AE 8 | AE 9 | AE 10 | AE 11 |
|---|---|---|---|---|---|---|---|---|---|---|---|
| Adhesive prop. Paper/paper | M | M | M | M | M | M | M | M | M | M | M |
| Adhesive prop. Silicone paper/silicone paper | M | C | C | C | C | M | M | C | M | M | C |
| Tack | a | a | a | a | a | a | a | a | a | a | a |

Assessment of adhesive bonding: A) adhesively separable C) cohesively separable M) material failure D) no pressure-activated adhesive bonding possible.
Assessment of tack: a) marked, aggressive b) barely distinct c) not present.

TABLE 2

Comparative examples (not according to the invention)/(use amounts in % by weight)

| | CE1 | CE2 | CE3 | CE4 | CE5 | CE6 | CE7 |
|---|---|---|---|---|---|---|---|
| Polyolefin (inv. 1) | 45 | 45 | 45 | 70 | | | 55 |
| Polyolefin (inv. 2) | | | | | 45 | 70 | |
| Versify 4200 | 30 | | | | 30 | | |
| Versify 4301 | | 30 | | 15 | | 15 | 15 |
| Vistamaxx 6502 | | | 30 | | | | |
| Regalite 1100 | 25 | 25 | 25 | | 25 | | |
| Sukorez SU 100 | | | | 15 | | 15 | 30 |
| Viscosity @170° C. [mPa · s] | 17 230 | 17 953 | 12 357 | 10 023 | 120 000 | 40 000 | 7000 (@150° C.) |
| Density [g/cm$^3$] | 0.882 | 0.884 | 0.882 | 0.871 | 0.885 | 0.872 | not known |
| Dahlquist criterion satisfied | no | no | no | no | no | no | no |
| Open time [s] | 45 | 30 | 95 | 60 | 120 | 135 | 140 |
| Adhesive prop. Glass/PET | D | D | D | D | D | D | D |
| Adhesive prop. PP/PP | D | D | D | D | D | D | D |
| Adhesive prop. PE/PE | D | D | D | D | D | D | D |
| Adhesive prop. Paper/paper | D | D | D | D | D | D | D |
| Adhesive prop. Silicone paper/silicone paper | D | D | D | D | D | D | D |
| Tack | c | c | c | c | c | c | c |

Assessment of adhesive bonding: A) adhesively separable C) cohesively separable M) material failure D) no pressure-activated adhesive bonding possible.
Assessment of tack: a) marked, aggressive b) barely distinct c) not present.

The examples according to the invention showed that identical or different substrates can be reversibly adhesively bonded with the aid of the pressure-sensitive adhesive composition according to the invention and that the adhesive connection can be separated either adhesively or cohesively without a resin or plasticizer needing to be used. These properties can be exploited when producing pressure-sensitive adhesive connections as for example are necessary for use in foodstuff packagings, diapers, female hygiene products and medical products such as for example plasters. The comparative examples do not display permanent tack and exhibit short open times. The usually relatively high melt viscosities of the comparative formulations are disadvantageous for an application from the melt because a high application temperature would be required. This leads to an increased energy requirement and can result in undesired thermal degradation of the polyolefins.

Raw materials used:
Vestoplast® and Eastoflex® are amorphous poly-α-olefins from the manufacturers Evonik and Eastman, respectively:
Vestoplast 828: Flow point (ASTM D97)>150° C.
Vestoplast 703: Flow point (ASTM D97)>120° C.
Eastoflex 1060: Flow point (ASTM D97)>120° C.

Versify® is an ethylene copolymer from the manufacturer Dow:
Versify 4200: Flow point (ASTM D97)>150° C.
Versify 4301: Flow point (ASTM D97)>150° C.
Vistamaxx® is a propylene copolymer from the manufacturer ExxonMobil:
Vistamaxx 6502: Flow point (ASTM D97)>150° C.
Sukorez® SU 100 and Regalite® 1010 are hydrogenated hydrocarbon resins from the manufacturers Kolon Ind and Eastman, respectively.

The invention claimed is:
1. A resin- and mineral oil-free pressure-sensitive adhesive composition, comprising 55%-99% by weight of a copolymer of propylene and one or more further monomers selected from ethylene and 1-olefins having 4 to 20 carbon atoms,
  wherein the copolymer has been prepared with the aid of metallocene catalysts and has
    a melt viscosity at 170° C. of 20 to 8000 mPas (DIN 53019),
    a density of 0.84 to 0.90 g/cm$^3$ (23° C., ISO 1183),
    a glass transition temperature of less than −30° C. (DIN EN ISO 11357-2:2014), a flow point, measured according to ASTM D97, of less than 50° C., and wherein a further polymer may optionally be present in the pressure-sensitive adhesive composition.

2. The pressure-sensitive adhesive composition as claimed in claim 1, wherein the copolymer has an enthalpy of fusion, measured according to ISO 11357-2, of 0-50 J/g.

3. The pressure-sensitive adhesive composition as claimed in claim 2, wherein the enthalpy of fusion, measured according to ISO 11357-2, is 0-30 J/g.

4. The pressure-sensitive adhesive composition as claimed in claim 3, wherein the enthalpy of fusion, measured according to ISO 11357-2, is 0-20 J/g.

5. The pressure-sensitive adhesive composition as claimed in claim 1, comprising 55%-99% by weight of the copolymer and 1%-45% by weight of at least one further polymer selected from polyolefins, waxes, natural or synthetic rubbers, polyacrylates, polyesters, polychloroprenes, polyvinyl ethers and polyurethanes.

6. The pressure-sensitive adhesive composition as claimed in claim 5, wherein the at least one further polymer is at least one polyolefin.

7. The pressure-sensitive adhesive composition as claimed in claim 6, wherein the at least one polyolefin has
a glass transition temperature of less than −15° C. (DIN EN ISO 11357-2:2014),
a melt viscosity at 170° C. of less than 50 000 mPas (DIN 53019) and
a flow point of greater than 50° C. (ASTM D97).

8. The pressure-sensitive adhesive composition as claimed in claim 1, wherein the pressure-sensitive adhesive composition has a Dahlquist criterion of G'≤105 Pa at 25° C. and 1 Hz.

9. The pressure-sensitive adhesive composition as claimed in claim 1, wherein the copolymer is derived from 70%-95% by weight of propylene and from 5%-30% by weight of ethylene.

10. The pressure-sensitive adhesive composition as claimed in claim 1, wherein the copolymer has a melt viscosity at 170° C. (DIN 53019) of 30 to 5000 mPas.

11. The pressure-sensitive adhesive composition as claimed in claim 10, wherein the melt viscosity at 170° C. (DIN 53019) is 50 to 3000 mPas.

12. The pressure-sensitive adhesive composition as claimed in claim 1, wherein the copolymer has a glass transition temperature, measured according to DIN EN ISO 11357-2:2014, of less than −35° C.

13. The pressure-sensitive adhesive composition as claimed in claim 12, wherein the glass transition temperature, measured according to DIN EN ISO 11357-2:2014, is less than −40° C.

14. The pressure-sensitive adhesive composition as claimed in claim 1, wherein the copolymer has a flow point, measured according to ASTM D97, of less than 40° C.

15. The pressure-sensitive adhesive composition as claimed in claim 1, wherein the pressure-sensitive adhesive composition further comprises at least one of organic or inorganic pigments, fillers, flame retardants, stabilizers, antistats, antioxidants and light stabilizers.

16. The pressure-sensitive adhesive composition as claimed in claim 1, wherein the copolymer has undergone polar modification.

17. A method of joining substrates comprising wetting and adhesively bonding the substrates with the pressure-sensitive adhesive composition as claimed in claim 1.

18. The method as claimed in claim 17 wherein the substrates comprise a substrate with a surface energy of less than 35 mN/m and one or more substrates with any surface energy.

19. The method as claimed in claim 18 wherein the substrate with a surface energy of less than 35 mN/m is a substrate made from Teflon or a substrate having a siliconized surface.

* * * * *